Patented Mar. 4, 1947

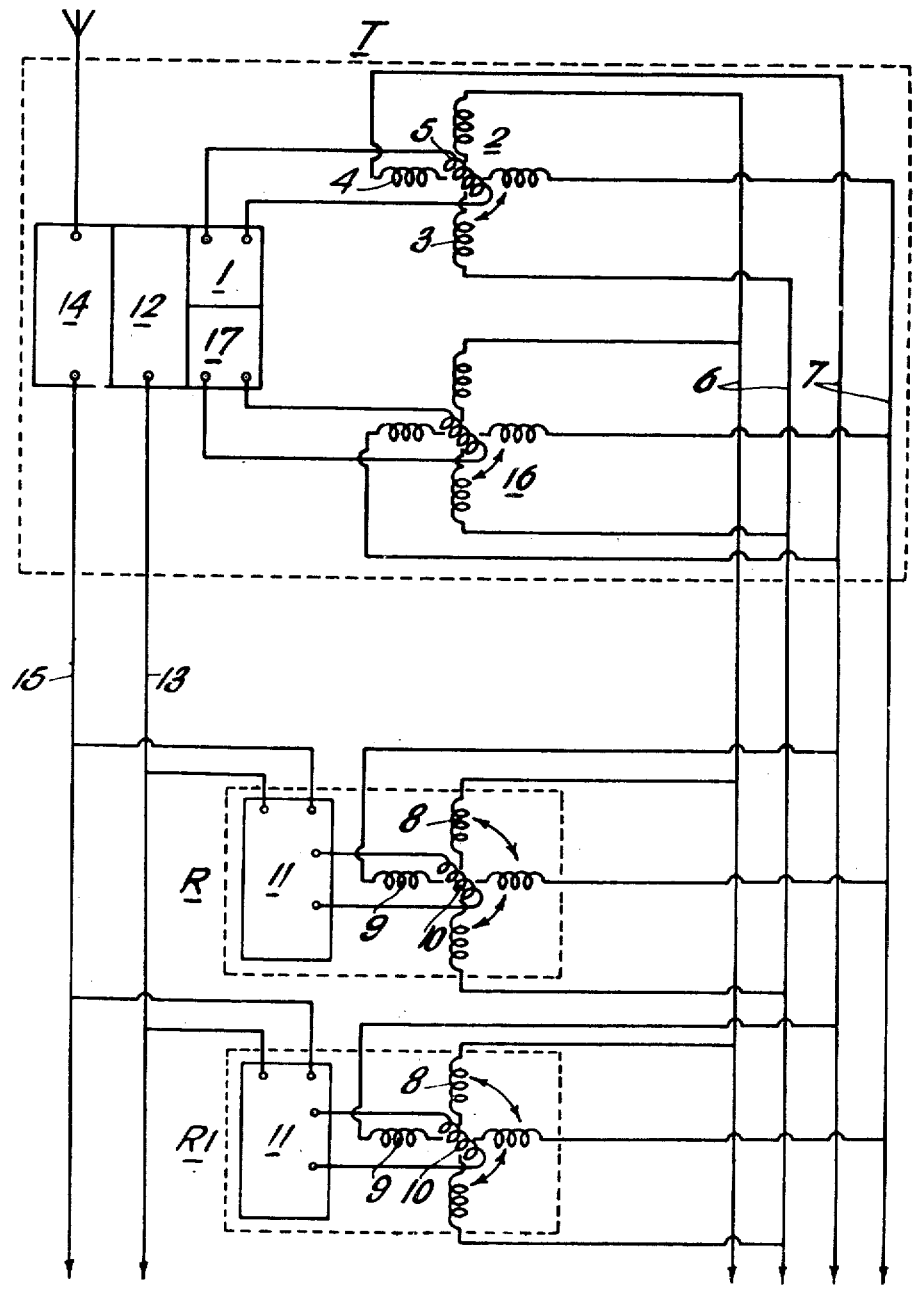

2,416,727

UNITED STATES PATENT OFFICE 2,416,727

APPARATUS FOR RADIO DIRECTION FINDING AND INDICATING

Paul Adorjan, Kingston Hill, England, assignor, by mesne assignments, to Communication Patents Limited, London, England Application September 8, 1941, Serial No. 410,056
In Great Britain February 21, 1940

13 Claims. (Cl. 35—1)

This invention relates to the art of radio direction finding and indicating and is more particularly concerned with the provision of apparatus whereby pupils can be taught the art without the necessity of employing radio transmitting stations or aircraft.

While it is usual to give prospective radio navigation operators a certain amount of ground training prior to instruction and training in an airplane, marine or other moving craft, it is found in practice that a considerable amount of training is necessary for such operators under actual working conditions. This more extensive training involves considerable expense and is moreover often unduly prolonged by reason of adverse weather conditions that prevent or limit operation of the aircraft or other mobile unit upon which the direction finding equipment is mounted.

Now, it is an object of the invention to provide an apparatus for simulating practical conditions pertaining to direction finding by radio and according to the invention such apparatus comprises means for obtaining electric signals and means whereby a characteristic of said signals can be varied to resemble the phenomenon of variable amplitude or phase relationship which is characteristic of the reception of radio signals during relative orientation of the radio direction finding receiver means and a radio transmitter.

The receiver for the signals includes means whereby adjustment of the variable characteristic of received signals may be determined, for example means for determining the actual phase relationship or the relative amplitudes of the signals. Such a receiver may comprise a normal direction finding apparatus or may be made to resemble in outward appearance and otherwise a normal apparatus.

A well known type of radio direction finder involves a receiver with two aerial systems the signals upon which are combined in phase opposition and means are provided to indicate the resultant signal. By appropriate mechanical design the voltages developed in the two aerial systems may be made to be equal and the resultant voltage is then dependent solely upon the phase relationship of the two aerial signals. If the wave front of the transmitted wave strikes the two aerials simultaneously then the resultant voltage is zero. Hence, by determination of the relative orientation of the aerials necessary to produce zero output the plane of the wave front of the received wave may be determined. Thus, it will be understood that directive signals may be simulated by applying to the two input circuits of a direction finder signals which are of the same frequency but different phase and amplitude. In some types of direction finders, for example those employing a loop or an Adcock aerial system it will be appreciated that the two input signals are those which appear on the two vertical components of the aerial and these components are effectively the two input circuits of the system.

Accordingly to simulate the directive signals the "transmitter" apparatus may comprise an oscillator with means for feeding to the pupil operator two signals of the same frequency and a device or circuit element adjustable by an instructor or otherwise to alter the relative phase or amplitude of the two signals in order to vary the apparent direction of the signal source. If now the pupil operator is provided with means for determining the relative phase or amplitude of the two signals which he receives, he may use that means in a manner which resembles the operation of a conventional direction finder. Means may also be provided whereby the sense of the simulation signals may be indicated.

In a simple embodiment of the invention the transmitter consists of a small high frequency oscillator from which two output circuits are provided, the amplitude of the signals in said two circuits being relatively adjustable by means of a device resembling an electric goniometer. The two output circuits are preferably connected over transmission lines to the receiving apparatus which may take various forms and in one example comprises a receiver having an input circuit of the kind used with a Bellini-Tosi type of radio goniometer. The two signals are fed to the goniometer coils, the normal aerial system being disconnected, and in the well known manner the goniometer may be adjusted to obtain a minimum reading and thereby give a corresponding indication of the apparent direction of the signal being received. If the relative amplitudes of the signals can be varied over a sufficiently wide range corresponding to a relative displacement over a range of 360°, the direction finding apparatus may be operated over the entire range of compass bearings.

With such an equipment an instructor may operate the amplitude changing means at the transmitter in order to transmit over the two conductive circuits signals which, when the direction finding apparatus at the receiver is correctly adjusted, will give an indication of the apparent direction from which the signal is being received.

In order that the invention can be more easily appreciated one preferred embodiment thereof will now be described by way of example with reference to the accompanying diagrammatic drawing.

This particular arrangement of radio direction finding trainer comprises a transmitter T adapted to be controlled by an instructor and receivers R and R1 each adapted to be controlled by a pupil operator. Although only two such receivers are shown it is to be understood that a greater number may be incorporated so that a large group of pupils can receive individual and simultaneous tuition from the same instructor.

The transmitter T includes an oscillation generator 1 and a device 2 resembling a radio goniometer. This device comprises two relatively fixed crossed coils 3 and 4 and a symmetrically disposed rotatable coil 5, the latter being connected to the output terminals of the oscillator 1. The coils 3 and 4 are connected to conductors 6 and 7 respectively which extend between the transmitter and the receivers.

Each of the receivers comprises a radio goniometer consisting of crossed coils 8 and 9, connected to the conductors 6 and 7 respectively, and a rotatable search coil 10 connected to a radio receiver 11. This goniometer and associated radio receiver can very well be an actual radio direction finding equipment of the type which the pupil will eventually be called upon to operate in practice.

It readily will be understood that electric wave oscillations can be induced in the coils 3 and 4 of the electrical goniometer device 2 and that the relative amplitudes of the signals in these coils, and consequently in the conductors 6 and 7 and the coils 8 and 9 of the receiving goniometers, will depend upon the position of the rotatable coil 5 of the goniometer device 2. Hence by adjusting the coil 5 the relative amplitudes of the signals delivered to the receiving goniometers can be varied and made to resemble the phenomenon of variable relationship which is characteristic of the reception of radio signals by a radio direction finding receiver during relative orientation of the receiver means and a radio transmitter. Furthermore it should be noted that this amplitude changing effect can be obtained without varying the relative position of the transmitter and the pupil's equipment.

The determination of the amplitude relationship of the signals being received can be made by adjustment of the search coil 10 in the manner well known. Thus a pupil readily can determine the apparent direction of a simulation transmitter and in order that the transmission can be sensed an appropriate sense finding signal is sent to the receiver by the instructor, for example through the intermediary of a sense producing signal means 12 and conductive path 13. As an alternative to the common conductive path 13 for the two receivers separate lines may be employed.

To render this simulation conditions even more realistic, normal radio transmissions are adapted to be received by means of a receiver 14 and are delivered to the receivers 11 by a conductive path 15. In this way the pupil operator can be subjected to interference conditions likely to be met in practice and consequently very thorough and concentrated training can be effected with the aid of the apparatus.

According to a further feature of the invention a plurality of signal sources are used in order that a pupil operator may ascertain his apparent location by taking the bearing of a number of transmitters as he would do in practice. The transmitter arrangements hereinbefore more particularly described are therefore multiplied and at the receiver means are arranged whereby the particular transmission received at any moment is selected in a manner resembling that by which the signals used for obtaining bearings are tuned in with a normal direction finding apparatus.

Thus in the case of the apparatus described with reference to the accompanying drawing a further electric goniometer device 16 is provided in association with a further oscillation generator 17. The crossed coils of the device 16 are connected to the conductors 6 and 7 so that, assuming the oscillators 1 and 17 are operating at different frequencies, two distinct signalling frequencies will be available from the said conductors. Either of these two signals can be tuned in by a pupil at a receiver in the same way as he would do during actual working of a direction finding apparatus. Three or more oscillation generators may be provided for feeding to the radio goniometers of the receivers signals of different frequency.

Thus a pupil is able to obtain a plurality of apparent bearings and if he is informed that the signals on a particular wave length correspond to certain known ground stations, he can then ascertain his apparent position.

In order further to simulate operating conditions which obtain in a moving craft, such as an aeroplane, the apparent direction of the signal source may be varied in a continuous manner. This variation may be effected by driving the coils of the transmitter goniometer devices by cam mechanisms, and by the adoption of appropriate cams predetermined apparent courses may be laid out. The pupil operator is thus enabled to plot continuously his apparent location on a map provided and in this way an apparent route may easily be plotted.

As previously mentioned the receivers such as R and R1 remain stationary and in order to produce the effect of their apparent orinentation with respect to a transmitter the relatively fixed cross coils 8 and 9 of the radio goniometers can be mounted to rotate, for example in association with a compass ring, said rotation being effected automatically or otherwise.

What I claim and desire to secure by Letters Patent is:

1. Apparatus for instructing students in the art of direction finding by radio, said apparatus comprising means for developing two electric wave signals of the same frequency, at least one receiver means responsive to said signals, and means adjustable to vary a functional relationship of the two signals to simulate at the receiver means the phenomenon of variable functional relationship of signal components that is characteristic of the reception of a radio signal during relative orientation of a radio direction finding apparatus and a radio transmitter.

2. Apparatus as recited in claim 1, wherein said adjustable means varies the relative amplitudes of the two signals.

3. Apparatus for instructing students in the art of direction finding by radio, said apparatus comprising means for developing two electric wave signals of each of a plurality of different frequencies, at least one receiver means responsive to said signals, and means adjustable to vary a functional relationship of the two signals of one of said frequencies independently of the signals of other frequencies, thereby to simulate at the receiver means the phenomenon of variable functional relationship of two signals that is characteristic of the reception of a radio signal during relative orientation of a radio direction finding apparatus and a radio transmitter.

4. Apparatus as recited in claim 3, wherein said adjustable means varies the relative amplitudes of the two signals of the same frequency.

5. Apparatus for instructing students in the art of direction finding by radio, said apparatus comprising means for developing two electric wave signals of the same frequency, receiver means responsive to said signals, means adjustable to vary the amplitude relationship of the developed signals to simulate at the receiver means the phenomenon of variable amplitude that is characteristic of the reception of a radio signal during relative orientation of a radio direction finding apparatus and a radio transmitter.

6. Apparatus for instructing students in the art of direction finding by radio, said apparatus comprising means for developing two electric wave signals each of a plurality of frequencies, receiver means tunable to respond selectively to signals of said different frequencies, and means for adjusting the amplitude relation of the two signals of one frequency independently of the signals of other frequencies.

7. Apparatus for instructing students in the art of direction finding by radio, said apparatus comprising means for developing electric wave signals, an electrical goniometer device receiving an input from said generating means and adjustable to provide an output containing two separate electric wave signals of the same frequency but having an amplitude relationship which varies with the angular adjustment of the goniometer device, and receiver means for determining the angular adjustment of said goniometer device as a result of the amplitude relationship of said two electric wave signals.

8. Apparatus for instructing students in the art of direction finding by radio, said apparatus comprising a plurality of electrical goniometer devices, means for applying an electric wave signal of different frequency to each of said devices, means for obtaining from each of said goniometer devices two separate electric wave signals of the same frequency but having an amplitude relationship which varies with the angular adjustment of the goniometer device, and at least one receiver means tunable selectively to the signals of different frequency and including means adjustable to determine the angular adjustment of the goniometer device as a result of the amplitude relationship of the received signals.

9. Apparatus for instructing students in the art of direction finding by radio, said apparatus comprising a transmitting electrical goniometer device, means for applying an electric wave signal to said device to obtain therefrom two separate signals of the same frequency but having an amplitude relationship which varies with the angular adjustment of the goniometer, a receiving electrical goniometer device including a search coil and two fixed coils to which said two signals are applied, and an electric wave signal responsive means coupled to the search coil of said receiving goniometer device, whereby the angular adjustment of the transmitting goniometer device can be determined by adjusting the said search coil.

10. Apparatus for instructing students in the are of direction finding by radio, said apparatus comprising an electric oscillation generator, a first electrical goniometer device having a pair of crossed coils and a relatively rotatable coil, means electrically coupling said rotatable coil with the oscillation generator, a second electrical goniometer device having a pair of crossed coils and a relatively rotatable coil, means electrically coupling the respective pairs of crossed coils, an electrical oscillation responsive means, and means electrically coupling said responsive means with the rotatable coil of the second goniometer device, whereby the angular setting of the rotatable coil of the first goniometer device can be determined by adjustment of the rotatable coil of the second goniometer device.

11. Apparatus for instructing students in the art of direction finding by radio, said apparatus comprising means for obtaining two electric wave signals of the same frequency, at least one receiver means responsive to said signals, means adjustable to vary the relationship of said signals to simulate at said signal responsive means the phenomenon of variable amplitude which is characteristic of the reception of a radio signal during relative orientation of a radio direction finding means and a radio transmitter, means for producing a sense determining signal, and means for applying said sense determining signal to the said receiver means.

12. Apparatus for instructing students in the art of direction finding by radio, said apparatus comprising a radio frequency oscillation generator, a first electrical goniometer device energized by oscillations obtained from the said generator to provide an output containing two separate radio frequency signals of the same frequency but having an amplitude relationship which varies with the angular adjustment of the goniometer device, a second electrical goniometer device, a radio frequency responsive means, means electrically coupling said second electrical goniometer device to said responsive means, whereby the angular adjustment of the first goniometer device can be determined by adjustment of the second goniometer device, and means for applying to the said second radio goniometer device the output signals from said first radio goniometer device.

13. Apparatus for instructing students in the art of direction finding by radio, said apparatus comprising a transmitting electrical goniometer device, means for applying an electric wave signal to said device to obtain therefrom two separate signals of the same frequency but having an amplitude relationship which varies with the angular adjustment of the said goniometer device, a receiving electrical goniometer device comprising a search coil and relatively fixed crossed coils to which the said two signals respectively are applied, and an electric wave signal responsive means coupled to the search coil of the said receiving goniometer device, whereby the angular adjustment of the transmitting goniometer device can be determined by adjusting the said search coil, the relatively fixed crossed coils of the receiving goniometer device being mounted for rotation so that apparent relative orientation of the receiving means and the transmitting means can be produced by rotating said crossed coils while said receiving and transmitting means remain relatively stationary.

PAUL ADORJAN.

REFERENCES CITED

The following references are of record in the file of this patent:

UNITED STATES PATENTS

| Number | Name | Date |
|---|---|---|
| 1,965,098 | Eaton | July 3, 1934 |
| 2,171,561 | Hooven | Sept. 5, 1939 |
| 2,164,412 | Koster | July 4, 1939 |
| 2,119,083 | Link | May 31, 1938 |
| 2,179,663 | Link | Nov. 14, 1939 |
| 2,110,869 | Crane | Mar. 15, 1938 |
| 2,023,488 | Poppen | Dec. 10, 1935 |
| 2,226,726 | Kramar | Dec. 31, 1940 |
| 2,254,159 | Sperti | Aug. 26, 1941 |

Certificate of Correction

Patent No. 2,416,727.                                             March 4, 1947.

PAUL ADORJAN

It is hereby certified that the name of the assignee in the above numbered patent was erroneously written and printed as "Communication Patents Limited"; whereas said name should have been written and printed as *Communications Patents Limited*, as shown by the record of assignments in this Office; column 6, line 14, for "are of" read *art of*; same column, line 23, for "electrical" read *electric*; and that the said Letters Patent should be read with these corrections therein that the same may conform to the record of the case in the Patent Office.

Signed and sealed this 15th day of July, A. D. 1947.

[SEAL]

LESLIE FRAZER,
*First Assistant Commissioner of Patents.* the said receiving goniometer device, whereby the angular adjustment of the transmitting goniometer device can be determined by adjusting the said search coil, the relatively fixed crossed coils of the receiving goniometer device being mounted for rotation so that apparent relative orientation of the receiving means and the transmitting means can be produced by rotating said crossed coils while said receiving and transmitting means remain relatively stationary.

PAUL ADORJAN.

REFERENCES CITED

The following references are of record in the file of this patent:

UNITED STATES PATENTS

| Number | Name | Date |
|---|---|---|
| 1,965,098 | Eaton | July 3, 1934 |
| 2,171,561 | Hooven | Sept. 5, 1939 |
| 2,164,412 | Koster | July 4, 1939 |
| 2,119,083 | Link | May 31, 1938 |
| 2,179,663 | Link | Nov. 14, 1939 |
| 2,110,869 | Crane | Mar. 15, 1938 |
| 2,023,488 | Poppen | Dec. 10, 1935 |
| 2,226,726 | Kramar | Dec. 31, 1940 |
| 2,254,159 | Sperti | Aug. 26, 1941 |

---

Certificate of Correction

Patent No. 2,416,727.  March 4, 1947.

PAUL ADORJAN

It is hereby certified that the name of the assignee in the above numbered patent was erroneously written and printed as "Communication Patents Limited"; whereas said name should have been written and printed as *Communications Patents Limited*, as shown by the record of assignments in this Office; column 6, line 14, for "are of" read *art of*; same column, line 23, for "electrical" read *electric*; and that the said Letters Patent should be read with these corrections therein that the same may conform to the record of the case in the Patent Office.

Signed and sealed this 15th day of July, A. D. 1947.

[SEAL]

LESLIE FRAZER,
*First Assistant Commissioner of Patents.*